(12) United States Patent
Albagli (10) Patent No.: US 6,266,391 B1
(45) Date of Patent: Jul. 24, 2001

(54) ARTIFACT COMPENSATION SYSTEM FOR MATRIX-ADDRESSED X-RAY IMAGING PANEL

(75) Inventor: Douglas Albagli, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/386,722

(22) Filed: Aug. 31, 1999

(51) Int. Cl.[7] ...................................... H05G 1/64
(52) U.S. Cl. .................. 378/98.2; 378/98.8; 250/370.09; 348/308
(58) Field of Search ................ 378/98.2, 98.7, 378/98.8, 207; 250/370.09, 370.11; 348/241, 243, 294, 297, 300, 301, 302, 308

(56) References Cited

U.S. PATENT DOCUMENTS

| | | |
|---|---|---|
| 5,340,988 | 8/1994 | Kingsley et al. . |
| 5,426,515 * | 6/1995 | Parker .............................. 348/308 X |
| 5,430,298 | 7/1995 | Possin et al. . |
| 5,579,358 | 11/1996 | Lin . |
| 5,610,404 | 3/1997 | Possin . |
| 5,648,654 * | 7/1997 | Possin .............................. 250/208.1 |
| 5,736,732 | 4/1998 | Possin et al. . |

* cited by examiner

Primary Examiner—David P. Porta
(74) Attorney, Agent, or Firm—Donald S. Ingraham; Douglas E. Stoner (57) ABSTRACT

A system for compensating for capacitively coupled artifacts in signals generated by a matrix-addressed x-ray imaging panel including a matrix-addressed array of sensing cells connected to respective integrating read-out amplifiers. While all scan lines are de-energized, a plurality of induced signals output by each amplifier are read, accumulated and averaged by a processor to form respective average values. During normal image panel operation, while scan lines are energized, processor subtracts respective average values from image signals output by respective amplifiers. The result is rounded to obtain an integer value for an image signal corresponding to each amplifier that is compensated for capacitively coupled artifacts.

26 Claims, 7 Drawing Sheets

ARTIFACT COMPENSATION SYSTEM FOR MATRIX-ADDRESSED X-RAY IMAGING PANEL

BACKGROUND OF THE INVENTION

The invention relates generally to matrix-addressed x-ray imaging panels, and more particularly, to a system for compensating for capacitively coupled artifacts and correcting an image signal generated by a matrix-addressed x-ray imaging panel.

Matrix-addressed x-ray imaging panels composed of amorphous silicon TFT and photodiode arrays have many useful applications in the fields of medicine and industrial inspection. Typically, solid state imaging systems use a two dimensional matrix, or photodiode array, to convert radiation into an image having an intensity proportional to incident radiant energy. In radiation imaging systems used in medical applications, radiation energy passing through, or emanating from, a patient's body is used for uninvasive in vivo visualization. An example of a high resolution solid state radiation imaging systems for such applications is exemplified by U.S. Pat. No. 5,340,988 assigned to the General Electric Company, the assignee of the instant application. Further, flat panel radiation devices that reduce phantom noise and image artifacts for improving resolution in such imaging systems are described in U.S. Pat. No. 5,610,404, also assigned to the General Electric Company.

An undesirable coupling known as capacitive coupling, also known as fringe capacitance, occurs between the photodiode electrodes and the data lines. As used herein, fringe capacitance is defined as the capacitance in a component or between a components and their connections other than the capacitance of a capacitor or capacitors.

This undesirable capacitive coupling degrades the performance of flat panel imaging devices. During some common imager operations the x-ray flux remains on during readout of the pixels. For example, in fluoroscopy imagers and imagers used in conjunction with radiation therapy, the radiation source is on continuously to maximize delivered dose, or is pulsed on periodically, resulting in radiation being incident on the detector array during the readout period. This simultaneous excitation and readout of the imager results in image artifacts or "phantom" images. The phantom images occur as a result of the fringe capacitive coupling between the respective photodiode electrodes and adjacent data lines. During the readout of a given photodiode attached to a given data line, the potential of the other photodiode electrodes, e.g., those associated with non-read pixels, continues to change as the radiation flux strikes the imager. The change in potential of the pixels not being read out is capacitively coupled into the data line, thereby inducing an additional charge which is read as part of the signal from the addressed pixel. This effect produces cross-talk or contrast degradation in the image, and is commonly evidenced in the display readout either as bright lines or dark lines (the latter having less "cross talk" than their neighbors).

Attempts to correct for the artifact caused by the additional charge, which degrades the quality of the image, have been made using a software correction algorithm. Such software, however, requires the total signal level on each data line to be known. If any region of the image is saturated, as frequently happens, then the total signal on each data line is not known and this software correction technique is less effective.

In order to obtain a high quality image, corrections must be made to the raw data obtained from the photosensor arrays to compensate for these effects. It is therefore seen to be advantageous that corrections be made to an image signal produced by a matrix-addressed imaging panel exhibiting capacitively coupled artifacts.

SUMMARY OF THE INVENTION

In an exemplary embodiment of the invention, a system for compensating for capacitively coupled artifacts and for correcting exposure of image signals generated by a matrix-addressed x-ray imaging panel comprises an apparatus providing real-time measurement of capacitively coupled signals applied to integrating readout amplifiers connected to respective photosensors arranged as a matrix-addressed array in the imaging panel. A scan line controller is configured to control field effect transistor (FET) switches (to a conductive or non-conductive condition) associated with respective sensors. In a condition in which the FET switches are de-energized, a reading circuit reads and accumulates an average of correction signals read from each amplifier, which signals correspond to respective data lines and comprise the sum of an amplifier offset inherent to the amplifier and capacitively coupled artifacts. During normal image processing, the scan line controller applies a signal on the scan lines to cause the FET switches to become conductive so that an image array signal is read from each amplifier. The capacitively coupled artifacts and amplifier offset are compensated for in each imaging array signal by a calculating circuit for producing corrected image signals that subtracts the average correction signal particular to each amplifier from the imaging array signal produced by that amplifier.

DETAILED DESCRIPTION

Figure 1:
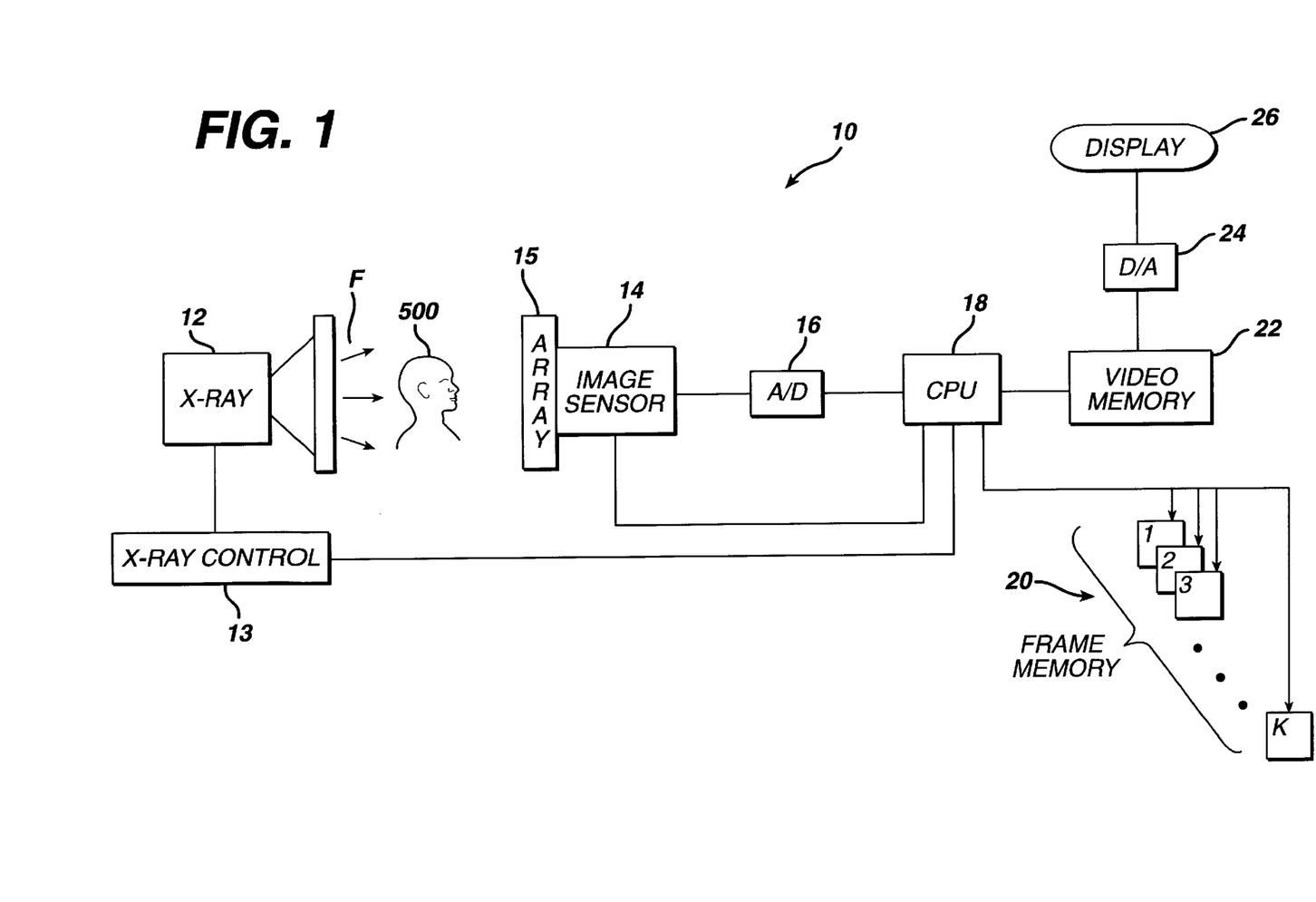
FIG. 1 is a simplified block diagram of the x-ray imaging system according to the present invention.

FIG. 1 is a simplified block diagram of a digital x-ray imaging system 10 according to the present invention. An x-ray source 12, controlled by a control 13, emits an x-ray irradiation field F toward the subject 500 to be imaged. An x-ray image sensor 14 located in the opposite side of the subject 500 from the source includes a two dimensional flat panel array 15 of light-receiving pixels that detects x-rays which pass through the subject. X-ray image sensor 14 typically includes a solid state flat panel 15 having a two-dimensional matrix of cells to be described later. An image signal output from the flat panel 15 is converted into digital data by an A/D (analog-digital) converter 16. The signal is processed by a CPU (central processing unit) 18 and then the signal is stored in frame memories 20 according to a predetermined arithmetic operation process. The reproduced tomographic image is delivered on a demand basis to a video memory 22, converted into an analog signal by D/A (digital-analog) converter 24, and then displayed via an image display device 26, such as a CRT (cathode-ray tube) display.

Figure 2:
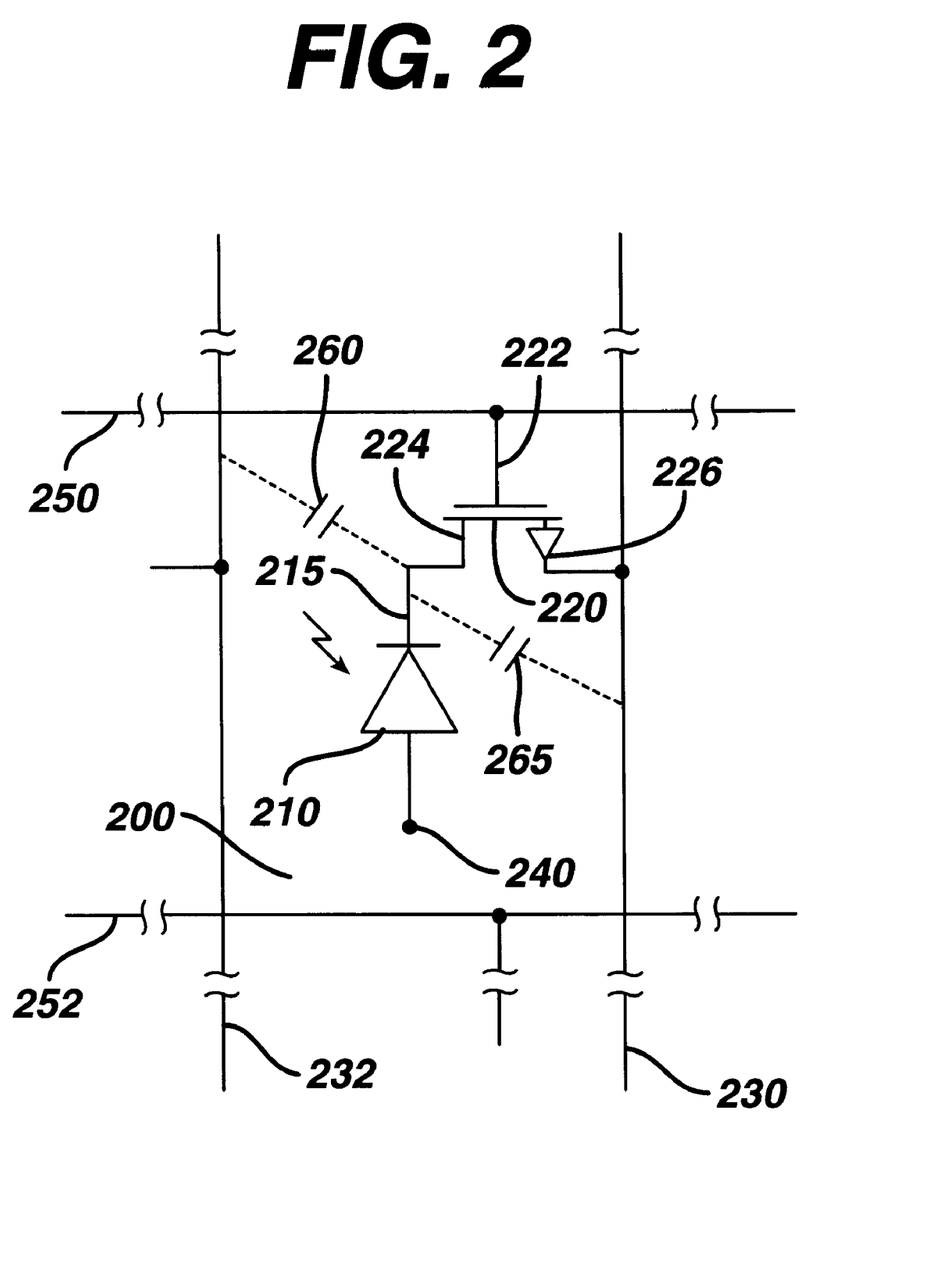
FIG. 2 is a schematic diagram of photodiode connections in a representative cell according to the present invention.
Figure 3:
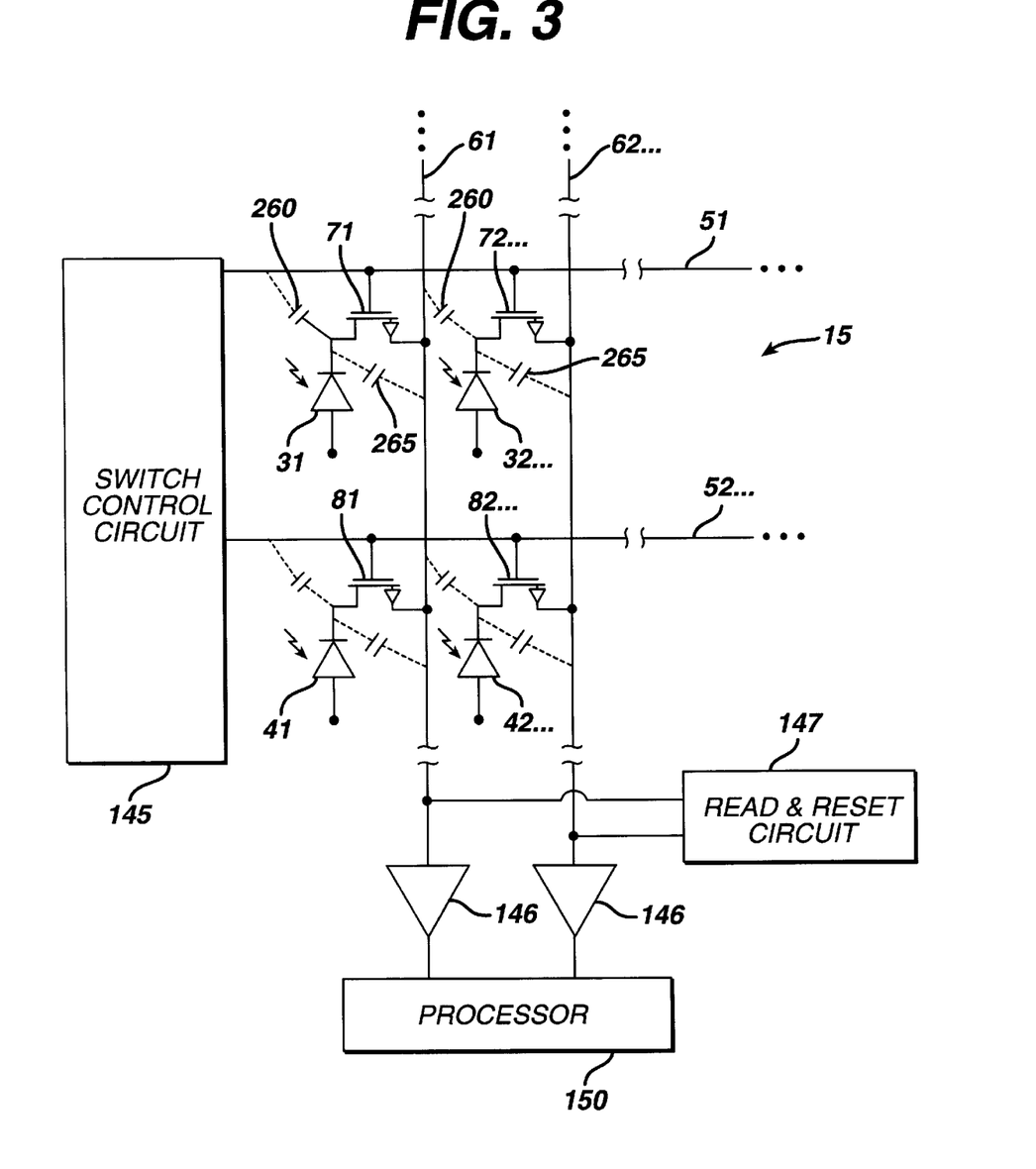
FIG. 3 is a schematic diagram of a plurality of the cell shown in FIG. 2 showing cell interconnections and associated cell control circuitry according to the present invention.

FIG. 2 shows a representative cell 200 with reference numerals associated with features in common with all cells of the cell matrix of flat panel 15, a portion of which are shown in relation to each other in FIG. 3. For clarity of illustration, these reference numerals are omitted from FIG. 3. FIGS. 2 and 3 also show solid line connections illustrating connections made over electrical conductors, and dashed lines illustrating induced coupling to be described later.

Representative cell 200 comprises a photosensor element shown as a photodiode 210 having a radiation sensitive element for generating a signal representing one pixel (not shown) of light received by a photodiode 210, and a switching element 220 for causing signals generated by photodiode element 210 to appear on a connected data line 230. The photodiode 210 includes a connection point 240 indicating a connection to a common electrode (not shown) and which is disposed over, but is insulated from photodiode 210. The switching transistor 220 is a field effect thin film transistor having a gate electrode 222, a drain electrode 224 and a readout electrode 226, also known as a source electrode.

The gate electrode 222 of switching transistor 220 is connected to scan line 250. In operation, a signal (e.g., a voltage) applied to scan line 250 to a specified threshold potential causes switching transistor 220 to become conductive. When switching transistor 220 is conductive, a conductive path is formed between photodiode 210 and data line 230 via drain electrode D and readout electrode 226, thereby allowing charge accumulated on the photodiode to be read out from data line 230. When the imager 10 is in operation, each photodiode common electrode connection point 240 is connected to a voltage bias source (not shown) that provides a bias different from ground potential.

FIG. 2 also illustrates several sources of capacitive coupling between conductive components in the representative cell 200. For purposes of illustration, FIGS. 2 and 3 symbolize capacitive coupling in phantom by capacitor symbols connected by dashed lines, and do not represent a separate capacitor component in the array. For example, there is capacitive coupling 260 between data line 232 and the adjacent junction between the photodiode electrode 215 and the drain electrode 224 of switching transistor 220. Capacitive coupling 265 also exists between data line 230 and the above-mentioned junction with electrode 215. (The representation in the figures in phantom is for illustrative purposes and does not represent a separate capacitor component in any way.) As used herein, "adjacent" conductive components refers to components that are spatially near one another but not in direct physical contact so that no direct conductive path (or short circuit) exists between the two components. Other sources of capacitive coupling contribute to 260 and 265, including capacitance between photosensor common terminal 240 and any data line and also between photosensor common terminal 240 and photosensor terminal 215. These effects are complicated by the capacitive coupling between adjacent cells, as various scan line and data line potentials change.

FIG. 3 illustrates a portion of the cells of array 15, each cell having the general representation of cell 200 shown in FIG. 2. By way of illustration and not limitation, an array 15 comprises a matrix of about 1000 by 1000 pixels fabricated on a 10 inch by 10 inch substrate. It should be recognized that a typical array of pixels and associated cells comprises M columns and N rows such that the image generated by a panel is derived from the combined outputs of all of the cells, when controlled by sequential activation of scan lines.

Scan lines 51, 52 correspond to scan lines 250, 252 of FIG. 2; data lines 232, 230 correspond to data lines 61, 62; photodiodes 31, 32 . . . , 41, 42 . . . , etc. correspond to photodiode 210; and transistors 71, 72, . . . , 81, 82, . . . , etc. correspond to transistor 220. As shown in FIG. 3 by dotted reference numerals, the components of all cells, scan lines, and data lines are extendible in number to suit the size of array 15.

For transistors 71, 72, . . . illustrated in FIG. 3 on the same row, e.g., the top row, respective gate electrodes 222 (FIG. 2) are connected to scan line 51. Similarly, for transistors 81, 82, . . . on a separate row, respective gate electrodes 222 (FIG. 2) are connected to scan line 52. For transistors 71, 72, each respective drain electrode 224 (FIG. 2) is connected to terminal 215 (FIG. 2) of a respective photodiode 31, 32 . . . etc. For transistors 71, 81, . . . on a same column, respective readout electrodes 226 (FIG. 2) are connected to data line 61, and for transistors 72, 82, on a separate column, respective readout electrodes 226 (FIG. 2) are connected to data line 62, etc.

The scan lines 51, 52 . . . (in addition to being connected to switching transistors 71, 72 . . . , 81, 82, . . . , etc.) are also connected to a scan line controller 145. The data lines 61, 62, . . . are connected to respective amplifiers 146, which are read and reset by circuit 147. Sequential scanning of pixels is achieved by turning on and off respective rows of switching transistors 71, 72 . . . , 81, 82, . . . , etc. by changes in scan line potentials under the control of scan line controller 145. A signal representing one pixel is conducted by a respective closed switching transistor to an associated data line that is connected to a respective readout amplifier 146.

The signal obtained from the readout amplifiers 146 includes a respective amplifier offset resulting from the particular electrical characteristics of the respective amplifier's circuit components, and also includes the combined effects of all capacitive couplings among the image panel components, scan lines, and data lines coupled to the respective amplifier. When any one of controlled switches 71, 72 . . . , 81, 82, . . . is turned on, the offset and capacitive coupled artifacts are combined with the image signal and are conducted over a respective data line to a respective amplifier 146. With all of the controlled switches 71, 72 . . . , 81, 82, . . . turned off, only the offset and capacitive coupled artifacts are present and form an unswitched, induced signal, which is conducted over a respective data line to a respective amplifier 146.

Figure 4:
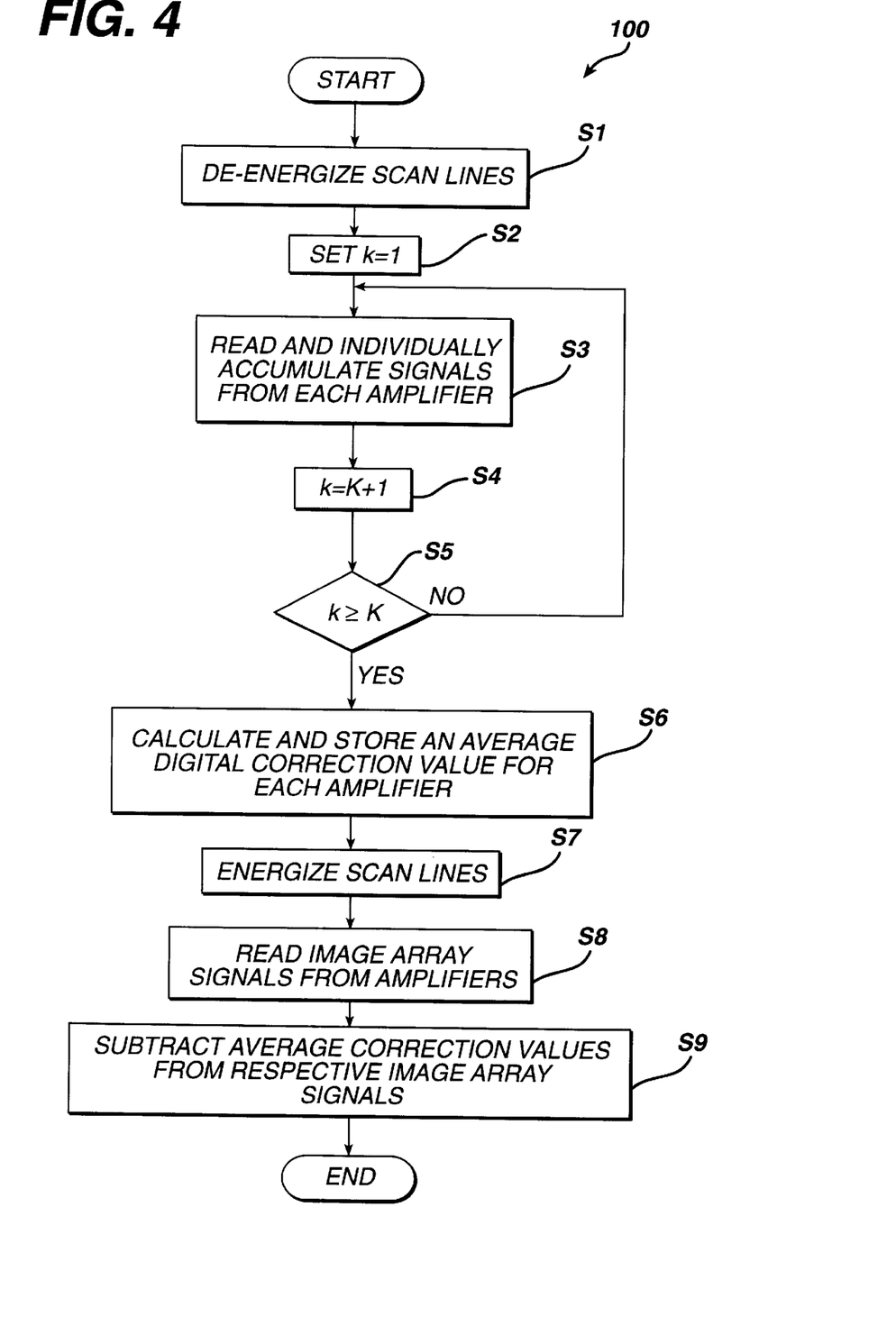
FIG. 4 is a flow diagram illustrating the real-time measurement and application of the capacitively coupled artifact correction according to the present invention.
Figure 6:
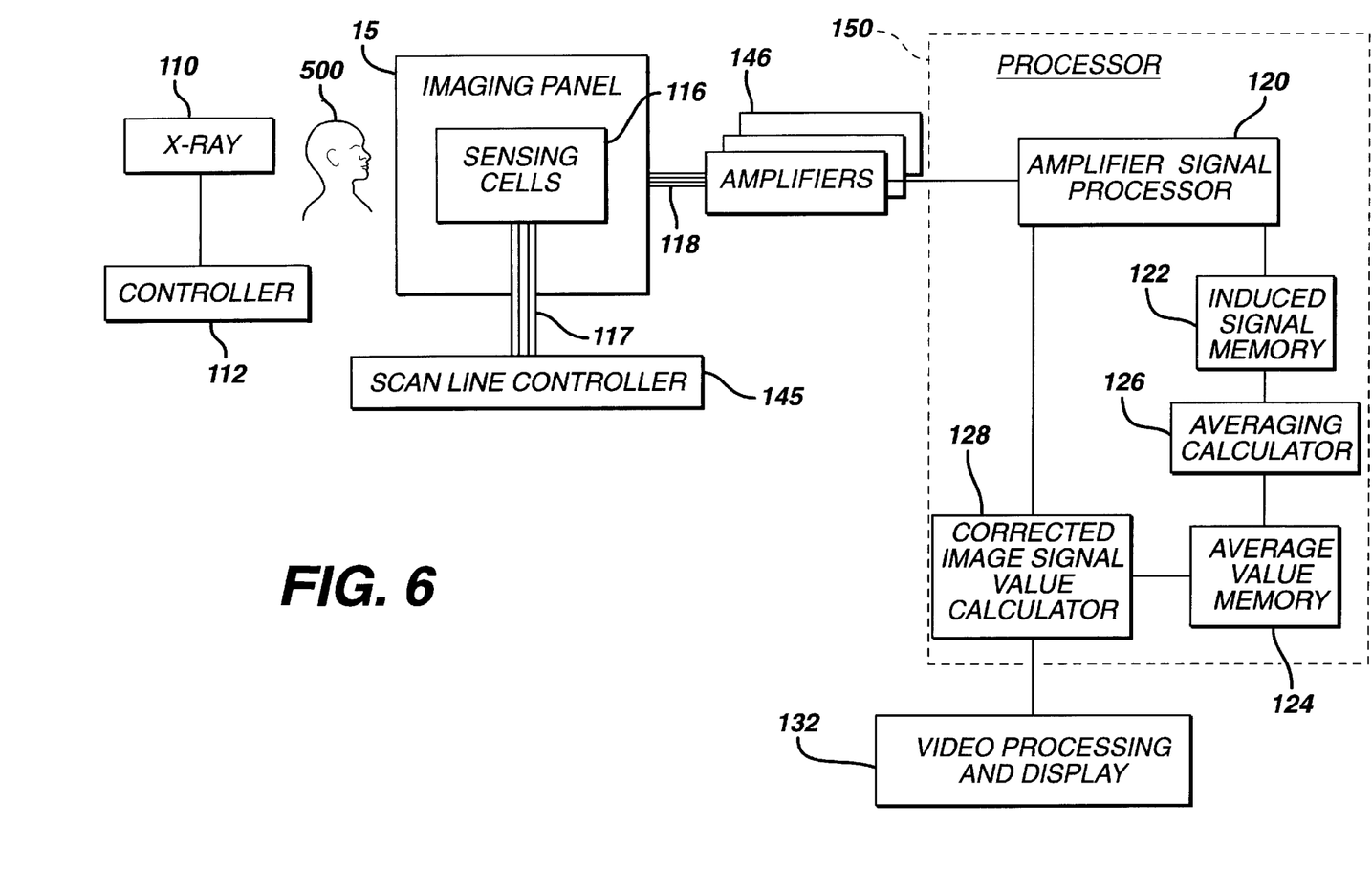
FIG. 6 shows an exemplary system for performing the method for correcting capacitively coupled artifacts according to the present invention.
Figure 7:
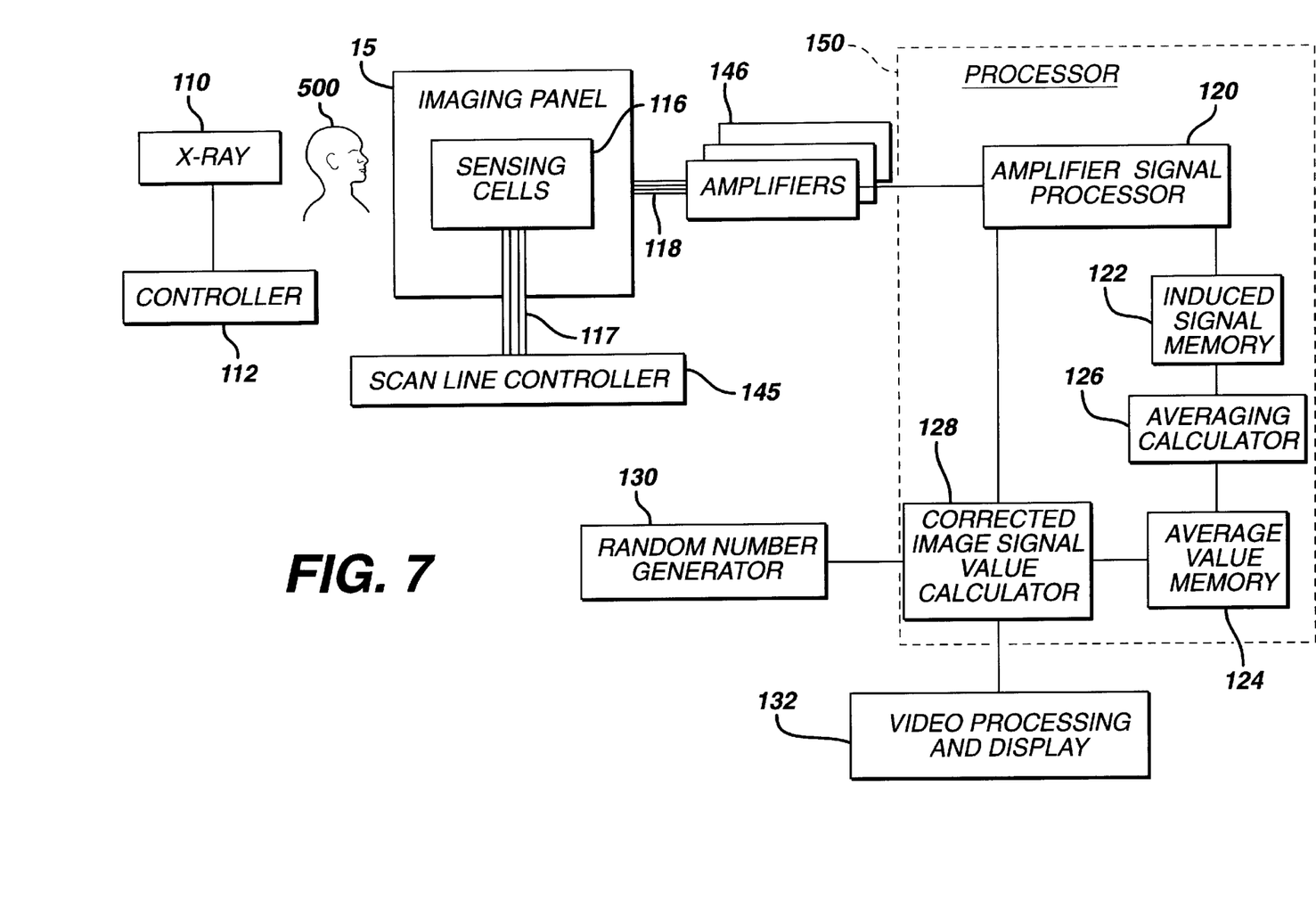
FIG. 7 shows the system of FIG. 6 including a random number generator connected to the signal correction calculator according to the present invention.

FIG. 4 is a flow diagram illustrating the method of the present invention as applied to image system 100, illustrated in FIGS. 6 and 7. The method takes advantage of the above-described induced signal being readable from each amplifier. As part of the present method, a preliminary determination is made as to the total additional K line times to be added to the overall read time of each read-cycle of the image system 100 to determine an average of the image signals repeatedly read from each amplifier 146 in image system 100 while the scan lines are de-energized. For these K additional reads, no scan lines are turned on and therefore the signal read at each amplifier is only the capacitively coupled charge and the amplifier offset for that amplifier.

Assuming the rate of x-ray exposure is constant over the N+K reads (N equals the number of rows of pixels), typically 20–2000 milliseconds, and the amplifier offsets are known, i.e., previously measured, this method allows the effects of the capacitive coupled artifact to be quantified and subtracted from the image signal. The average signal value obtained from each amplifier during the K line time interval is stored and subsequently subtracted from every image signal obtained as a readout from that amplifier during normal operation of image system 100.

With the K total additional line times pre-established, the sequence of the method begins with step S1, at which all scan lines are de-energized. At step S2, the counter k is set equal to 1. At step S3, each amplifier output is read and the respective signal values are accumulated while the scan lines remain de-energized. At steps S4 and S5, counter k is incremented until all K reads have been completed. While K can be assigned any value, preferably the value of K is in the range between about 1 and about 16, with the larger values used to provide sub-count precision and to average the effects of electronic noise. Preferably, in order to minimize the effects of drift in the x-ray intensity during the readout procedure, k/2 calibration reads are performed before the imager readout and the other k/2 calibration reads after the imager readout. At step S6, the amplifier output values are individually averaged to form a stored correction value representing an average capacitively coupled charge and amplifier offset for each respective amplifier. At step S7, all de-energized scan lines are energized so that at step S8, digital values of each pixel can be read from an associated amplifier while the image system, such as image system 100, irradiates a subject 500, as illustrated in FIGS. 6 and 7.

In step S9, the stored correction value associated with each individual amplifier is subtracted from the digital value of each pixel read from that respective amplifier to give an image signal accurately representing the imaged subject. In step S10, the result is rounded to obtain a digital count representing a final, corrected image signal that is compensated for capacitively coupled artifacts and amplifier offset and is suitable for visible display by well known methods.

It will be appreciated that the digital correction of a capacitively coupled artifact presents a potential problem because the correction is performed after the pixel readout data has been digitized. Only quantified corrections can be made, i.e., 1 count, 2 count, etc. Although this is not a problem for an individual pixel, this situation presents a potential problem for a spatially correlated structure such as the data lines. If the values of all the pixels on one data line are 0.5 counts too high with respect to the neighboring data line, the effect will be clearly visible. Thus, the method for correcting the capacitively coupled artifact must be good to a fraction of a count, e.g., <$1/10$ of a count, in order to satisfactorily suppress the artifact. This standard can be accomplished through a more complex image processing algorithm.

Figure 5:
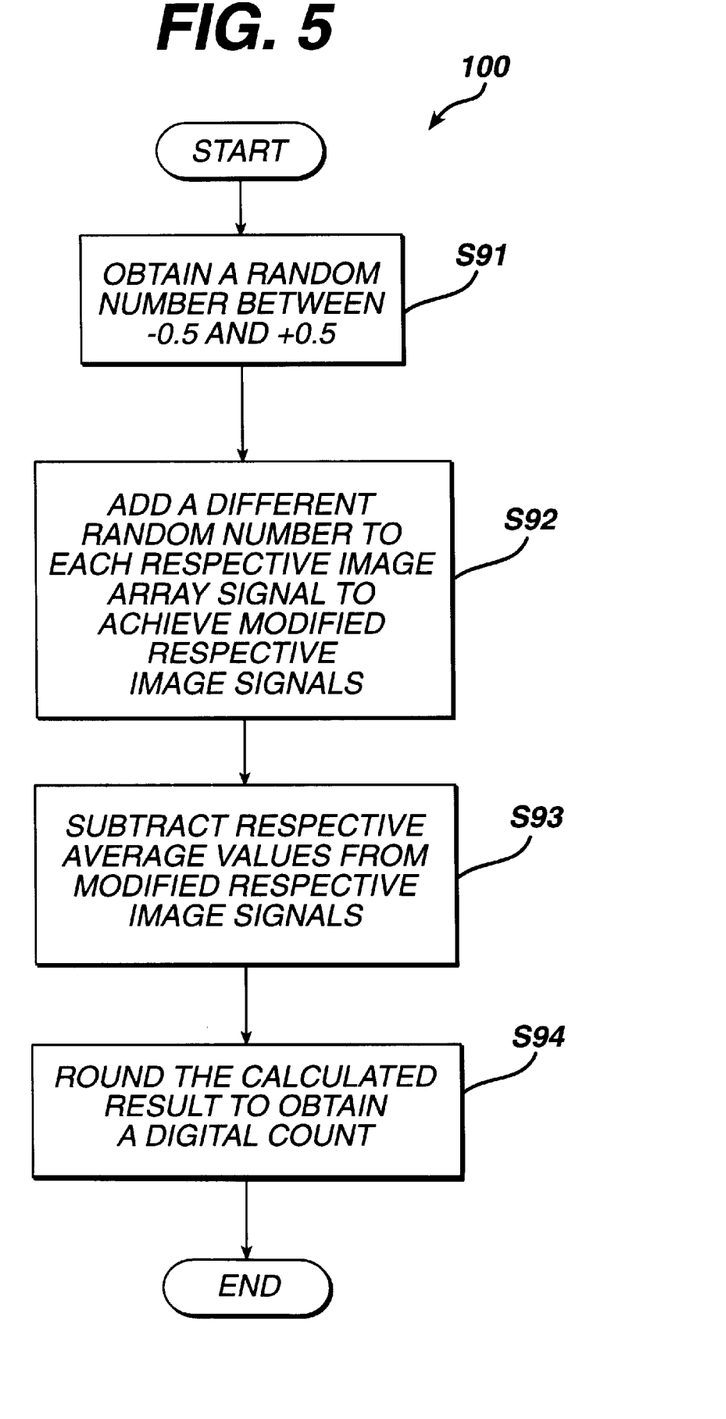
FIG. 5 is a flow diagram illustrating an alternative embodiment of the method shown in FIG. 4 according to the present invention.

FIG. 5 illustrates an alternative embodiment of the method shown in FIG. 4, in which step S9 is replaced by steps S91–S94. In steps S91 and S92, a different random number between specified values, for example, between −0.5 and +0.5, is obtained and then added to the digital value of each pixel. Then, in step S93, the correction value, which already has sub-count precision due to the averaging procedure of K reads, is subtracted from the digital value of each pixel. Finally, at step S94, the data are rounded to provide the correct digital count for a final corrected image signal.

Referring now to FIG. 6, the exemplary system 100 is illustrated as including an x-ray radiation source 110 controlled by the controller 112 for irradiating a subject, an imaging panel 15 which is the same imaging panel 15 shown in FIG. 3, amplifiers 146, scan line controller 145, and a programmable processor 150.

The imaging panel 15 comprises photosensors 116 controlled by controller 145 connected to scan lines 117, the photosensors 116 also connected by data lines 118 to readout amplifiers 146, arranged and connected as shown in FIG. 3. Each photosensor 116 is operatively controlled form a connected scan line 117 connected to scan line controller 145 to selectively pass a signal from the sensor 116 to a corresponding data line 118. Columns of photosensors are connected by respective data lines 118 to respective amplifiers 146. The amplifiers 146 are connected to the processor 150, which preferably is a programmed computer memory, and includes an amplifier signal processor 120 for polling the amplifiers 146, calculators 126 and 128, and memory 122 and 124. The amplifiers 146 are connected to amplifier signal processor 120 for reading both image signals and induced signals applied to each amplifier 146 from data lines 118. The amplifier signal processor 120 has a first output and a second output. The first output is connected to the induced signal memory 122 for individually storing induced signals read from respective amplifiers when the scan lines are de-energized. An averaging calculator 126 connected to induced signal memory 122 averages the stored accumulated induced signal values to yield an average correction value for each amplifier, which is stored in average value memory 124. The second output of amplifier signal processor 120 is connected to a corrected image signal value calculator 128, which also is connected to the average value memory 124. The corrected image signal value calculator 128 calculates a corrected value for every image signal read from any given amplifier polled the amplifier signal processor 120, by subtracting the corresponding stored average value for that amplifier received from average value memory 124 from the imaging array signal received from the amplifier signal processor 120. The result is provided as an integer output to a video processing and display 132.

In an alternative embodiment shown in FIG. 7, a random number generator 130 for producing random numbers between specified values, for example, between −0.5 and +0.5, is connected to the corrected image signal calculator 128, which adds a different random number produced by the generator 130 to each stored image array signal and then subtracts the average correction value calculated for the amplifier from which the image array signal was read, from the sum. The corrected signal in integer form is output to video processing and display 132.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of compensating for capacitively coupled artifacts in imaging array signals provided by a plurality of sensing cells in a matrix-addressed x-ray imaging panel, each sensor being connected by a corresponding controlled switch to a corresponding data line, said data lines being sequentially arranged, each of said controlled switches being controlled from a connected scan line to selectively pass a signal from the corresponding sensor to said corresponding data line, each of said data lines being connected to a respective one of a plurality of amplifiers, the method comprising the steps of:

de-energizing the scan lines of the imaging panel;

reading respective induced signals from said amplifiers while the scan lines are de-energized;

energizing said scan lines;

reading respective imaging array signals from said amplifiers while the scan lines are energized; and processing said respective induced signals and said respective imaging array signals to output respective corrected imaging array signals that are compensated for capacitively coupled artifacts.

2. The method of claim 1, wherein the step of de-energizing comprises de-energizing all scan lines, and the step of energizing comprises energizing all scan lines.

3. The method of claim 1, wherein said respective induced signals are a plurality of induced signals read over a specified time period.

4. The method of claim 1, wherein said specified time period is a range of between about 1 and about 16 line times.

5. The method of claim 1, wherein the step of processing further comprises:

averaging said respective induced signals to produce respective average values; and subtracting said respective average values from said respective imaging array signals to produce respective corrected image array signals.

6. The method of claim 1, further including the step of computing digital values for said respective corrected image array signals.

7. The method of claim 5, further comprising:

generating random numbers selected between specified minimum and maximum numbers;

adding a different one of said random numbers to each of said respective image array signals to achieve modified respective image array signal values; and said subtracting comprises subtracting said respective average values from said modified respective image array signal values to output respective corrected imaging array signals.

8. The method of claim 7, wherein said minimum and said maximum numbers are −0.5 and +0.5, respectively.

9. The method of claim 8, further including the step of computing digital values for said respective corrected image array signals.

10. The method of claim 1, wherein the imaging energy source applies x-rays, the sensing cells provide signals corresponding to an x-ray image of the object, the capacitive coupling of the sensing cells to the data lines is a result of fringe capacitance, and each of the sensing cells is a photodiode.

11. A method of compensating for capacitively coupled artifacts in imaging array signals provided by a plurality of sensing cells in a matrix-addressed x-ray imaging panel, each sensor being connected by a corresponding controlled switch to a corresponding data line, said data lines being sequentially arranged, each said controlled switch being operably controlled from a connected scan line to selectively pass a signal from the corresponding sensor to said corresponding data line, all said scan lines having voltages set to a predetermined value in a specified direction, each said data line being attached to a respective one of a plurality of amplifiers, comprising:

applying imaging energy from an imaging energy source to said imaging panel;

de-energizing all scan lines of the imaging panel;

reading respective induced signals from said amplifiers while the scan lines are de-energized;

averaging said respective induced signals to produce respective average values;

energizing said scan lines;

reading respective imaging array signals from said amplifiers while the scan lines are energized;

subtracting said average values from said respective imaging array signals to produce respective corrected image array signals that are compensated for capacitively coupled artifacts.

12. The method of claim 11, wherein said respective induced signals are a plurality of induced signals read over a specified time period.

13. The method of claim 12, wherein said specified time period is a range between about 1 and about 16 line times.

14. The method claim 11, further comprising the steps of:

generating random numbers selected between specified minimum and maximum numbers; and adding a different one of said random numbers to each of said respective image array signals to achieve modified respective image array signal values;

said subtracting step comprising subtracting said respective average values from said modified respective image array signal values to output respective corrected imaging array signals.

15. The method of claim 14, wherein said minimum and said maximum numbers are −0.5 and +0.5, respectively.

16. The method of claim 11, further including the step of computing digital values for said respective corrected image array signals.

17. The method of claim 11, wherein the step of reading further comprises reading imaging array signals appearing on half of the data lines before reading all scan lines and reading imaging array signals appearing on a remaining half of the data lines after reading all scan lines.

18. A system for correcting imaging array signals produced by a matrix-addressed sensing panel having controllable scan lines comprising:

a plurality of sensing cells arranged in columns and rows, each sensing cell arranged to output respective imaging array signals when said scan lines are energized and respective induced signals when said scan lines are de-energized;

a plurality of amplifiers each connected to at least one of said plurality of sensing cells to receive said respective imaging array signals and said respective induced signals from said sensing cells; and a processor connected to said amplifiers for polling said amplifiers to read said respective image array signals and said respective induced signals and process said respective image array signals and said respective induced signals to yield respective corrected imaging array signals that are compensated for capacitively coupled artifacts and output said respective corrected imaging array signals.

19. The system of claim 18, wherein said respective induced signals are a plurality of induced signals read over a specified time period other than when said scan lines are energized.

20. The system of claim 19, wherein said specified time period is a range of between about 1 and about 16 line times.

21. The system of claim 18, wherein said processor includes a calculator for averaging said respective induced signals to produce respective average values.

22. The system of claim 21, wherein said processor further includes a corrected image signal value calculator for subtracting said respective average values from said respective imaging array signals to output respective corrected imaging array signals.

23. The system of claim 22, further comprising a random number generator for adding a different random number selected between specified minimum and maximum numbers to each of said respective image array signals to achieve a modified respective image array signal values.

24. The system of claim 23, wherein said minimum and maximum numbers are −0.5 and +0.5, respectively.

25. The system of claim 23, wherein said random number generator is connected to said corrected image signal value calculator, and said corrected image signal value calculator is arranged to subtract said respective average values from said modified respective image array signal values to output respective corrected imaging array signals.

26. The system of claim 18, further comprising a video processing and display connected to said processor for displaying said corrected image array signals.

* * * * *